(12) United States Patent
Brochu et al.

(10) Patent No.: US 6,994,355 B2
(45) Date of Patent: Feb. 7, 2006

(54) PIPE SEAL

(75) Inventors: Ronald P. Brochu, Westbrook, CT (US); James J. Burnes, Deep River, CT (US)

(73) Assignee: Infiltrator Systems Inc., Old Saybrook, CT (US)

(*) Notice: Subject to any disclaimer, the term of this patent is extended or adjusted under 35 U.S.C. 154(b) by 132 days.

(21) Appl. No.: 10/677,769

(22) Filed: Oct. 1, 2003

(65) Prior Publication Data
US 2005/0073113 A1    Apr. 7, 2005

(51) Int. Cl.
*F16L 5/02*    (2006.01)

(52) U.S. Cl. .................. 277/606; 277/616; 285/215

(58) Field of Classification Search .............. 277/606, 277/616, 917, 626, 644; 285/3, 4, 230, 345, 285/215; 403/243, 225, 263
See application file for complete search history.

(56) References Cited

U.S. PATENT DOCUMENTS

| | | | |
|---|---|---|---|
| 4,663,036 A * | 5/1987 | Strobl et al. ................ 405/52 |
| 4,805,920 A | 2/1989 | Gavin | |
| 5,087,151 A * | 2/1992 | DiTullio ................ 405/43 |
| 5,286,040 A * | 2/1994 | Gavin ................ 277/606 |
| 5,624,123 A | 4/1997 | Meyers | |
| 5,711,536 A | 1/1998 | Meyers | |
| 5,882,014 A | 3/1999 | Gavin | |
| 6,322,108 B1 * | 11/2001 | Riesselmann et al. ......... 285/3 |
| 6,386,550 B1 * | 5/2002 | Mokrzycki et al. ......... 277/616 |
| 6,602,023 B2 * | 8/2003 | Crescenzi et al. ........... 405/42 |
| 6,817,631 B1 * | 11/2004 | Gavin ................ 285/139.1 |

* cited by examiner

Primary Examiner—William L. Miller
(74) Attorney, Agent, or Firm—C. Nessler

(57) ABSTRACT

A molded plastic seal assembly, for use with a leaching or stormwater system component, comprises at least two embossed, preferentially eccentric, circles. Pulling on a tab tears out the interior portion of the seal, to create a hole which accommodates a first pipe diameter. A remaining crescent portion surrounding the hole has a multiplicity of perforations or other means for thinning. Thus, second larger diameter pipe pushed into said hole, deforms the crescent inwardly, so the hole diameter is increased, sufficient to fit and form a seal with the second pipe outside diameter. A seal assembly article made of polypropylene has a very thin wall at the bottom of the tear-out groove. Part of the injection mold is moved during molding, to enable filling of the mold in vicinity of the thin wall.

16 Claims, 4 Drawing Sheets

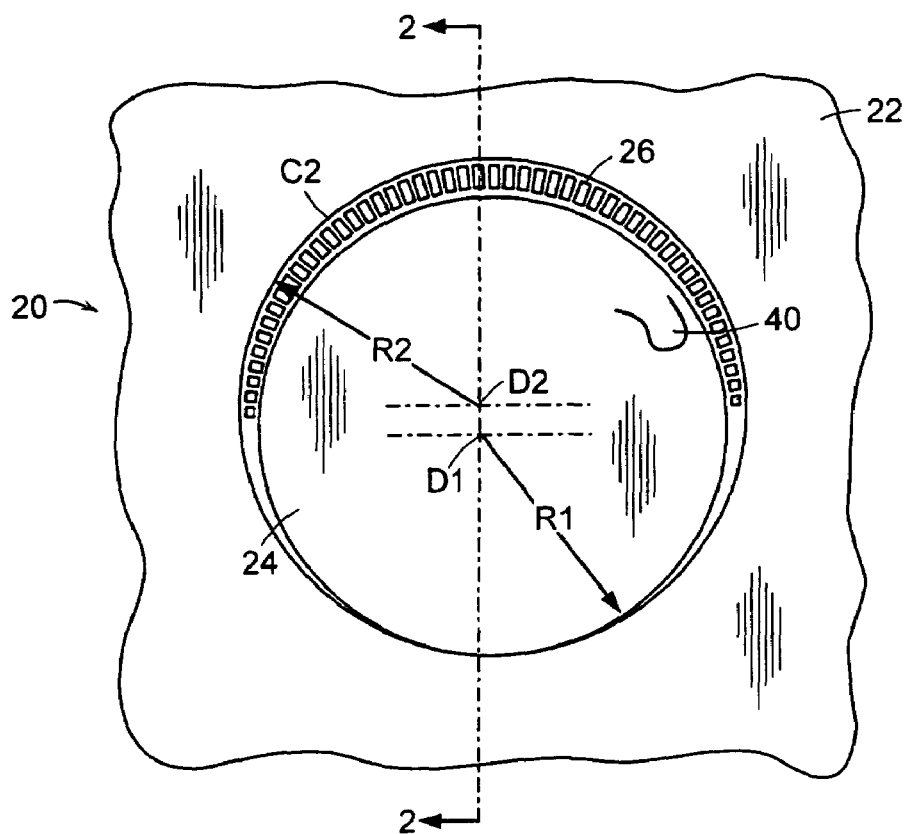
FIG. 1
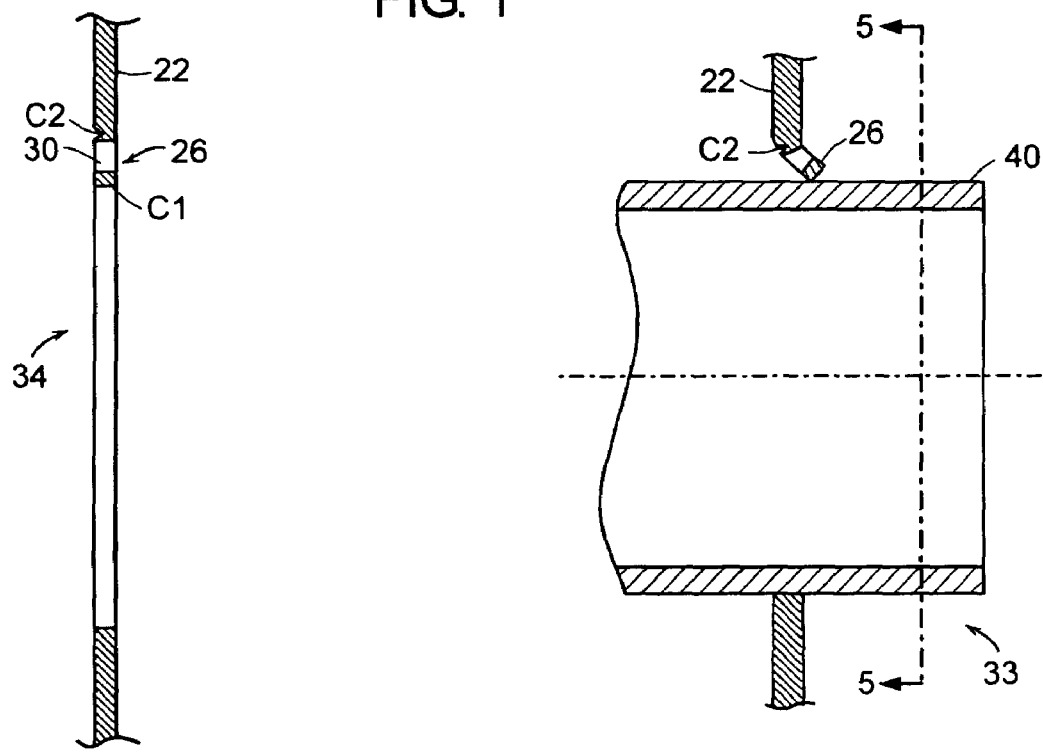
FIG. 2
FIG. 3

PIPE SEAL

TECHNICAL FIELD

The present invention relates to molded plastic pipe seals, particularly for use when piping penetrates the wall of an underground chamber or other component, particularly those used in connection with handing wastewater and stormwater.

BACKGROUND

The present invention is particularly adapted for use with wastewater and stormwater systems, wherein components are buried beneath the earth. For example, wastewater may flow through plastic pipelines, i.e., circular conduits, running from a septic tank to a distribution box, and then to leaching chambers, galleries, etc.

The outer diameters of familiarly used pipes may vary from one installation to another, or within an installation, according to the installer's choice of the size and type of piping. For instance, the basic size may vary between 2, 3 and 4 inches. And for any nominal pipe size, the outer diameter may differ by a significant amount, according to the specification to which the piping conforms. For example, a 4 inch diameter SDR35 PVC (polyvinylchloride) pipe has an actual outside diameter of about 4.25 inches, while a 4 inch diameter Schedule 40 PVC pipe has an actual outside diameter of about 4.5 inches.

Leaching and stormwater system components, which are often connected by pipes, are typically made of molded plastic or concrete, uncommonly metal. It is an objective to have flexibility in installing such components, so that they can receive different size piping, and so there is a sufficient seal at the point of pipe entry, to prevent significant intrusion of soil and the like. It is also an objective to minimize the amount of labor in creating the seal and to keep component costs low.

To accomplish such objectives in the past, various embossed plastic seal assemblies have been commercially used. For concrete components, assemblies are separately formed and then molded into the wall of the component when it is cast. For plastic components, they are typically integrally formed when the article is molded. An aim of the seal might be to minimize extraneous water flow into or out of the component. More typically, the object is simply to prevent intrusion of surrounding soil into the component.

One general feature of many seal assemblies is to have a series of embossed or grooved circles, concentric or eccentric, where a pipe seal is desired. Thus, the installer can choose the one that fits the piping at hand. In the most basic embodiment, the installer uses a knife to cut along the embossing. In other seal designs, the embossing comprises a reduced thickness circle, or groove. The circular plastic piece contained within the groove is torn out by embossed pull tabs. For examples of such kind of prior art, see U.S. Pat. Nos. 4,805,920 and 5,882,014 to Gavin.

In other prior art seal assemblies, the pipe slips into a conical shaped seal, inboard of the exterior wall surface of the seal assembly. The seal expands radially, to make a tight conforming fit to the pipe. See U.S. Pat. No. 5,711,536 to Meyers. The prior art seals which are typically made of low density polyethylene (LDPE) have various advantages and disadvantages associated with their functionality, cost, ease of use, resistance to abuse, etc. LDPE has tear properties which make any tear out portion susceptible to comparatively easy tearing and removal, with various shapes and depths of grooves. And that kind of material provides the seal with a degree of compliance, so different pipe line entry angles can be accommodated.

When a pipe seal is molded as an integral part of an article, such as a molded leaching chamber or distribution box or other item, which has an interior concavity, there is more constraint on the complexity of seal assembly design, both because of mold considerations and because of the need to stack articles for shipment. Another design difficult, attending integrally molded seals relates to a contradiction in desired properties. When there is a pull-tab tear-out seal, rather inferior strength is desired at the point the tear is made. On the other hand, high tensile and tear strengths and good fracture toughness properties are desired for the whole of a typical component. Since the latter requirements tend to dominate, it becomes difficult to tear out some integrally molded seals, and their ease of use is lost. For example, the ASTM D1004 Graves Tear test shows that, compared to LDPE, initial tear resistance of polypropylene is 40–50 percent greater.

Another problem associated with tear out seals is that there is a tendency for a tear propagating in one groove to jump across the land to an adjacent closely spaced groove, thus producing a hole larger than wanted, and an ineffective seal results. Grooves associated with the two different outside diameters of commercial 4 inch pipe, mentioned above, are prone to this problem.

SUMMARY

An object of the invention is to provide a seal assembly, for preventing intrusion of surrounding soil and the like, which seal assembly can conveniently and economically be molded into a molded thermoplastic article, such as a leaching or stormwater chamber component, which component has to be nested for shipment. Another object is to provide in a pull tab tear out type seal assembly improved means for accommodating pipe diameters which vary slightly from one another. Another object is to provide a seal assembly configuration which is suitable for a high strength, tear resistant thermoplastic, such as polypropylene (PP), and to provide a means for manufacturing such.

In accord with the invention a molded plastic seal assembly, has a place for a hole, and a circumscribing deformable portion which surrounds the hole when created. The deformable portion has spaced apart weakened spots, such as perforations or thin wall regions. When a pipe, which is larger in diameter than the hole, is inserted into the hole, the deformable region deforms plastically and elastically, radially outwardly to accommodate the pipe. The material of the deformable portion which is close to weakened spots deforms preferentially.

In accord with the invention, a seal assembly comprises at least two embossed, preferentially eccentric, circles C1 and C2, which are contained within a frame which may be an integral part of the wall of an article, or which may be shaped for inclusion into an object, such as a cast concrete article. The material encompassed by the smaller inner circle C1 may be removed, to create a hole for a first diameter pipe. The remaining material which surrounds a hole so-created, has a multiplicity of weakened spots, which are perforations or thinned wall regions. The material surrounding the hole may be crescent shaped, in the case of eccentric circles C1 and C2, or ring shaped, in the case of concentric circles C1 and C2. Said surrounding material behaves as described in the preceding paragraph. In another embodiment, the seal assembly may have another smaller circle inside circle C1, so that upon removal of the material within, a still smaller pipe may be received.

In accord with the invention, a seal assembly is made of substantially polypropylene. Encircled portions of material with the assembly are removed by tearing, such as by pulling on a molded-in tab, which separates said material along embossing which is a deep V-shape groove. Alternately, the embossing which defines the circles may be more superficial, or may be raised, and cutting by a knife or saw may be used to remove the material within a circle.

In further accord with the invention, the groove of a seal assembly has a narrowly pointed wedge shape bottom, and the wall is very thin at the bottom of the groove, preferably about 0.005–0.01 inch. The seal assembly is preferably formed by injection molding, using a method that enables filling the mold and fully forming the part, which would otherwise be difficult or impossible using conventional technique. In the method of making a seal with groove, the portions of the mold which define the groove are spaced apart a first distance, so the hot and soft plastic can flow about the projection on the mold which forms the groove. Then, while the plastic is still soft, the mold parts are brought closer together, to form the final dimensioned seal assembly. The seal assembly is amenable to molding as an integral part of a larger object, such as a leaching chamber or end cap. The seal assembly is compact in design and suited for inclusion on articles which require good nesting.

The foregoing and other objects, features and advantages of the invention will become more apparent from the following description of preferred embodiments and accompanying drawings.

BRIEF DESCRIPTION OF THE DRAWINGS

FIG. 1 is a vertical elevation end view of a seal assembly.

FIG. 2 is a vertical cross section through the assembly of FIG. 1, where the center portion of the assembly has been removed.

FIG. 3 shows, in vertical cross section, a pipe running through the seal assembly shown in FIG. 2.

DESCRIPTION

Figure 4:
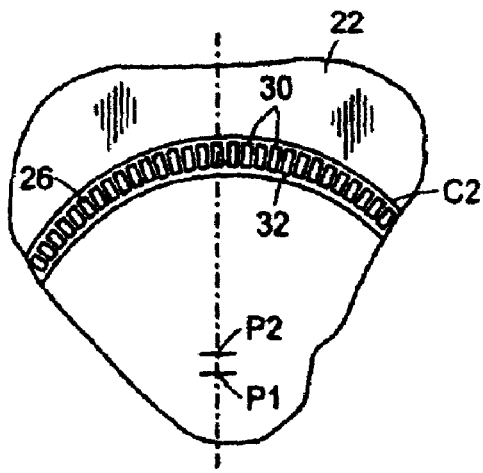
FIG. 4 is a fragmentary view of the seal assembly of FIG. 1.

FIG. 1 shows a seal assembly 20, which is molded into and integral with the wall 22 of a molded thermoplastic article, such as a leaching chamber, an end plate for a chamber, a distribution box, or other article or accessory familiar in subsurface wastewater disposal systems. The part 22 surrounding the outer circle C2, more generally called here the frame of the seal assembly, is part of the seal assembly. So, when seal assembly 20 is a free-standing (so that it might be attached or incorporated into some component, such as a concrete article), frame 22 may be a circumscribing flat or contoured structure. When the seal assembly is integrally molded into an article, frame 22 will be part of the wall of the article.

The exemplary seal assembly 20 of FIG. 1 is configured for accepting either of two diameter pipes, such as a 4.25 inch and 4.5 inch outside diameters. The groove circles C1 and C2 have diameters which substantially conform with the pipe diameters. Assembly 20 has a central tear out portion 24, defined by an embossed circle C1 having radius R1. The embossings referred to herein are preferably thinned sections, i.e., grooves. For instance, when the basic wall thickness is about 0.090 inch, the embossed line region will be a V-shape groove, the bottom of which is about 0.005 inch from the opposing surface. The groove and manner of making are described in detail below.

At the point of use, an installer will tear out the circular portion 24, defined by groove at C1. Typically, this is accomplished by pulling on molded-in pull tab 40, which is defined by a groove similar to groove shown at C1. The details of the preferred tab construction are given below in connection with FIG. 10. In the generality of the invention, a pull tab does not have to be used, since an installer can cut or punch into the portion 24, sufficient to create a tear, and to free part of the portion, so that he can then pull on the free part, to propagate the tear, so it runs to and along groove at C1. Alternatively, the embossings may be shallow grooves, or raised portions, to define where an installer may simply knife-cut or saw, to remove the material within the circle of the embossing.

Another grooved circle C2 having radius R2 is part of the seal assembly. R2 is larger than R1. The center of rotation P2 of the circle C2 is displaced upwardly in the Figure from the center of rotation P1 of circle C1, so that the circle circumferences nearly coincide or coincide at their bottoms. Crescent 26 is the portion of the seal assembly material which lies between the circles C1 and C2. With reference to FIG. 4, a fragment of the seal assembly shown in FIG. 1, crescent 26 is characterized by a multiplicity of spaced apart rectangular perforations 30. For purposes of illustration, the perforations in all Figures are shown with exaggerated size, particularly, width. Their preferred actual size is given below. They enable the crescent to distort and deflect, as described below. Continuous interior rim 32 runs around the part of the crescent lying along circle C1, after the hole for a pipe has been made.

FIG. 2 is a cross section of the seal showing the hole 34, having circumference C1, which is created when the center portion 24 is removed. In a first way of using the seal, where the pipe outside diameter closely fits the circle C1, the installer slides a pipe through the hole created by removal of the center portion 24. The dimensions of the perforations 30 are chosen to be small enough, so that only a small and acceptable amount of soil might run into the interior of the article having the seal, before larger pieces in the soil substantially clog the openings.

Figure 5:
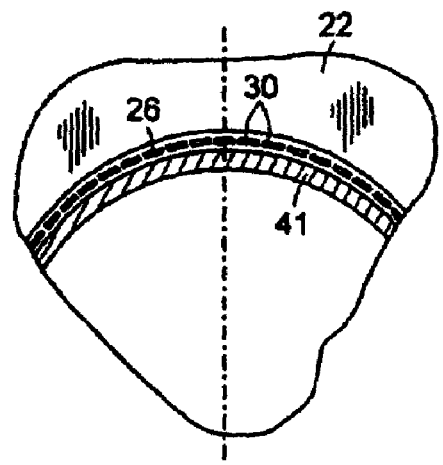
FIG. 5 is a fragmentary view of the pipe and seal assembly shown in FIG. 3, as viewed from the interior of an article to which the seal is affixed.

In a second use, a pipe having a diameter greater that of circle C1, is pushed into the seal hole 34. FIG. 3 shows the seal assembly with such a pipe 41, inserted by force into hole 34, which has resulted in deformation of crescent 26, toward the interior 33 of the article in which the seal is mounted. There has been resultant enlargement of the hole, and crescent 26 now comprises a conical lip seal in contact with the pipe. See the view of FIGS. 5 and 6, looking from the interior of the seal assembly along the pipe centerline. The bottom of the pipe rests on the undistorted bottom edge of the hole, that is the region where circles C1 and C2 are substantially co-incident.

Figure 6:
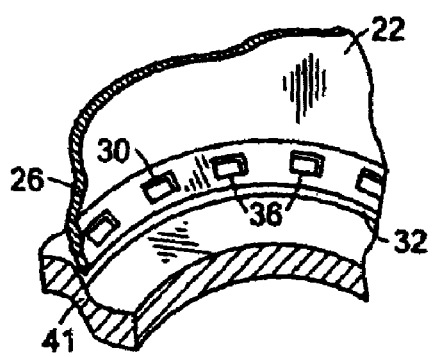
FIG. 6 is a fragmentary isometric close-up view of combination of pipe and seal shown in FIG. 3 and FIG. 5, looking downwardly at an angle onto the pipe, to show the distortion of the seal crescent.

A close up of the distorted crescent 26 in FIG. 6 shows how the segments 36 of the rim 32 have distorted by elongating, principally at those segments 36 of the rim which are radially interior of the perforations 30. The diameter of the rim 32 has increased to fit the outside diameter of pipe 41. Rim 32 has elongated to an extent that does not exceed the plastic limit of the material. As is well known for elastic material behavior, the rim deformation is a combination of elastic and plastic deformation. And thus, the residual elasticity of the material in vicinity of the rim tends to keep the rim tight around the pipe. Perforations 30 have become distorted in trapezoidal fashion, as illustrated with exaggeration in FIG. 6. But since a multiplicity of small perforations 30 are provided, the increase in dimension of any perforation is not such as to create openings which are excessively large compared to the soil characteristics. The inward slope of the deformed crescent is favorable for preventing soil entry, since any soil surrounding the exterior of the seal tends to enter an opening, only to the extent of the angle of repose characteristic of the soil. In actual practice, the diameter of groove C2 is made slightly larger than the diameter of the largest diameter pipe 41 which is intended to be accommodated, to provide for some variation, and to provide radial space for curving of the plastic material, where the crescent bends at the groove location.

Figure 11:
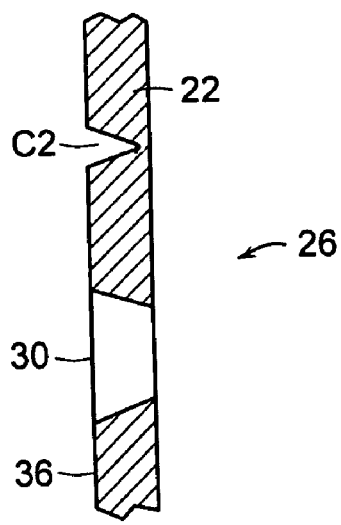
FIG. 11 is a cross section detail of a portion of FIG. 2, showing crescent and perforation configuration.

As an example, where C1 is 4.25 inches and C2 is 4.6 inches, there are 19 rectangular perforations of nominally 0.030 to 0.060 inches wide (i.e., circumferentially) by 0.25 inches high (i.e., radially). The perforation height decreases as perforations near the die-out of the crescent, at the left and night in FIG. 1. The perforated portion of the crescent comprises about 50% percent of the circumference C2. Preferably, perforations 30 are formed with an inward taper, as shown in FIG. 11, which is a detail from FIG. 2, so perforation opening on one side of the seal is larger than on the opposing side. The inward taper provides less material at the outer surface of the deflectable portion 26, thus making the portion preferentially yieldable for inward deflection, while maintaining a desired small perforation size.

The pipe-induced expansion in hole 34 diameter predominately takes place in the part of the crescent which has perforations, i.e., in a region which is about 50% of the circumference of hole 34. For the example above, the gross elongation in that 50% crescent portion 26 is about twelve percent; and, that elongation is concentrated in rim portions 36 adjacent the perforations, which rim portions comprise about 4–8% of the 50% segment of rim 32 which has perforations. As a result, in the example, the plastic in rim portions 32 may elongate around 35%. Depending on the exact seal configuration, there may be some concurrent deformation elsewhere, in crescent portion 26, namely around the lower half of hole 38, which could lessen the demanded total elongation of the rim. For example, when the bottoms of circles C1 and C2 are slightly spaced apart rather than coincident, there can be some deformation of the material interior of circle C2. Generally, a structurally compliant and effective seal is obtained.

In other embodiments, the interior removable portion 24 may comprise additional smaller diameter embossed circles with associated pull out tabs, so that other small diameter pipes may be accommodated through the same seal assembly. The disclosure of U.S. Pat. No. 5,882,014 to Gavin is hereby incorporated by reference with respect to such feature's, as are taught elsewhere in the prior art.

Figure 7:
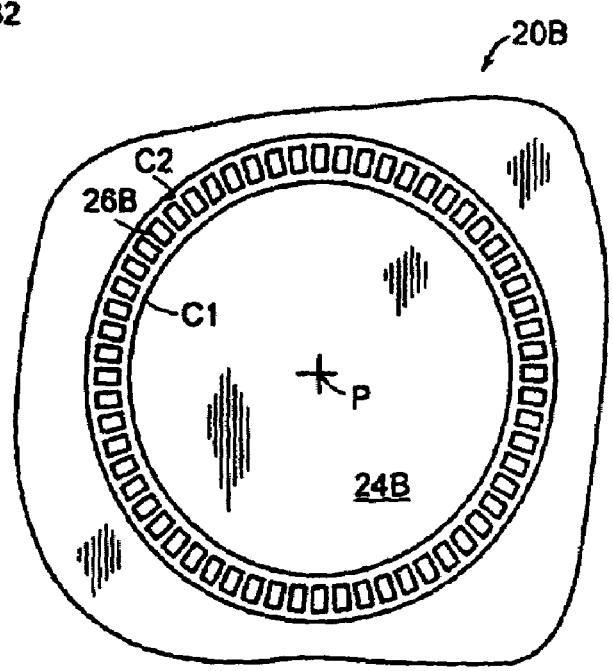
FIG. 7 is a view like FIG. 1, showing a seal assembly embodiment having a concentric comparatively weakened region, which deflects when a pipe is inserted into the seal opening.

The smaller diameter seal embossments may be concentric or eccentric with the circle C1. As illustrated by seal assembly 20B in FIG. 7, the invention can be applied to a seal where the circles C1 and C2 are concentric, and the deflectable portion 26B of the seal is a ring rather than a crescent. (Suffixes in the Figures denote elements which correspond with previously described elements.) However, the configuration of FIG. 1 is preferred, because should there be vertical load on the pipe, the bottom of the opening is less prone to unwanted deformation.

In the invention, the perforations 30 may have other shapes, such as round, oblong, etc., and the width may vary substantially from the example, including to the point the perforation becomes a slit. In the generality of the invention, the crescent has weakened spots, spaced apart around a portion of the circle of the crescent. For example, perforations may be replaced with a multiplicity of very thin wall spots of comparable or slightly larger dimension. Such regions will act structurally weak, and perform in substantially the same way as perforations. A combination of perforations and thinned spots may be used. In another embodiment, the whole of the crescent portion 26 (and corresponding part 26B shown in FIG. 7) may be made of thin material. That configuration is inferior to the preferred constructions, where the lands (spokes) between perforations have substantial thickness and thus provide significant section modulus to the crescent 26, which helps resist an inward pressure of the mass of soil outside of the seal.

Mostly seals will be subjected to a single insertion of one diameter pipe. Thus the fact that in a preferred embodiment a major portion of the deflection or distortion of the crescent 26 is inelastic, and thus permanent, is not a disadvantage. In the generality of the invention, where there is a lesser degree of diameter difference between diameter C1 and the pipe outside diameter, the deformation of the deformable region, i.e., crescent 26 may be elastic. In most instances, the deformation will exceed the elastic limit of the material. Yet, the elasticity which the material has, upon reaching its maximum deformation during use, will cause the seal to press on and frictionally engage the outside surface of the pipe inserted into the hole. In another embodiment, a crescent having features like those described may have a rim which is designed to fracture upon deformation, so the resultant deformed crescent comprises a plurality of radial fingers in contact with the pipe.

Figure 10:
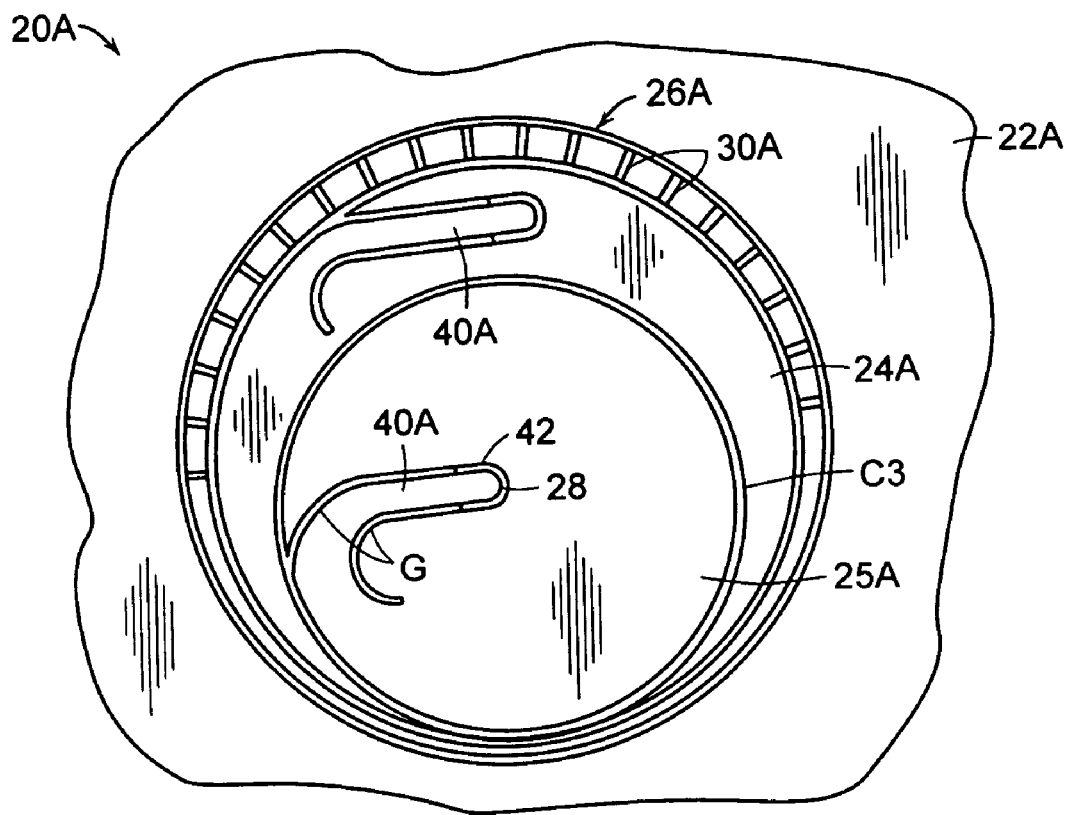
FIG. 10 is an elevation view of a preferred seal assembly, for three different diameter pipes.

The seal assembly 20A in FIG. 10 illustrates how further smaller circles may be provided, such as portion 25A defined by circle C3, to accommodate smaller diameter pipes. The principles of the perforated seal may of course be applied to the circle C3, so that slightly variant diameters of small pipes can be accepted.

FIG. 10 shows a typical preferred tab 40A. Except for the tip, the tab is defined by groove G which has the character previously described fore the circle grooves. The tip of the tab is defined by, a U-shape perforation, or cut-out 42, which enables the tab can be more easily lifted up from the plane of the seal assembly, for pulling. Various raised features, such as a boss or fin, may be put on the end of the tab to facilitate grabbing of the tab.

The seal assembly described herein may be fabricated as a free standing unit, so it may be attached to or incorporated into some component. In such case frame 22 may comprise a circumscribing flange, such as flanges 28, 1228 shown in U.S. Pat. No. 5,711,536 to Meyers, or radial appendages, such as flange 26, rim 28 and arms 31, shown in U.S. Pat. No. 4,805,920 to Gavin.

A free-standing seal assembly may be included in the sidewall of a molded concrete distribution box, for instance as described in U.S. Pat. No. 4,805,920. It may be integrated into an accessory for a leaching system, for instance into a leaching chamber endplate, as described in U.S. Pat. No. 6,602,023 of Crescenzi et al. It may be molded into the walls of leaching chambers, and it may be integrated into or attached to the endwalls or other parts of stormwater chambers, for instance as described in U.S. Pat. No. 5,087,151 of DeTuillo.

The invention may be utilized as an improvement in combination with features of other seals known in the prior art. For instance, the invention may be used as the exterior tear-away or cut-away surface of a seal assembly, where there is an additional conical interior member to seal against the pipe, as shown in U.S. Pat. No. 5,624,123 to Myers. Features taught by Myers to induce deformation of a lip seal might be used in variations of the present invention.

While seals have been described in terms of wastewater and storm water chambers for burial beneath the earth, the invention may be applied to other kinds of products in fields which include heating, ventilating, plumbing, electric, pneumatics and so forth—wherever there may be a need for a seal which can accommodate differing diameter pipes or other objects.

Seals in the invention may be made of various commercial materials, including low density polyethylene (LDPE), high density polyethylene (HDPE) and polypropylene (PP), preferably by injection molding. Within the scope of claims, plastic material refers to any material which both elastically and plastically elongates.

A material which is substantially all polypropylene (PP) is a preferred material for certain chambers. PP presents unique problems because it is much more resistant to tearing than is the heretofore favored seal material, LDPE. In LDPE prior art devices a typical groove might have a rounded or flat bottom and extend deep enough so that only about 0.020 inch thickness material remains. When such prior art grooves are applied to a typical commercial PP (for instance Fortilene TG6801 Polypropylene from BP Amoco in Naperville, Ill.), and tearing out is attempted, not only is a lot of force required, but the tear will tend to wander from the groove.

Figure 8:
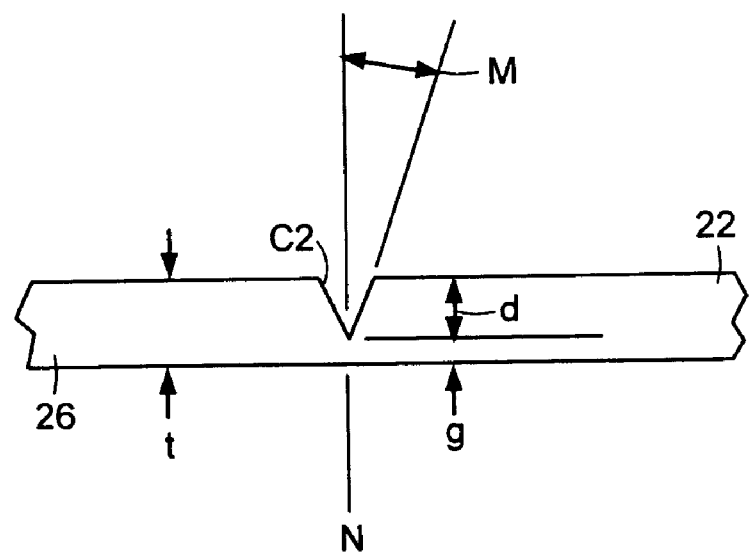
FIG. 8 is a cross section through a portion of the seal assembly, to show the shape of a typical groove used for polypropylene.

Thus, with reference to FIG. 8, a cross section through a portion of the seal assembly in FIG. 1, typical groove C2 is preferably V shape, and extends to a depth d, such that the thickness g of the remaining material is less than about 0.010 inch, preferably about 0.005 inch. In an example, the wall/frame thickness t is about 0.090 inch. Thus, the groove depth will preferably be about 90% or more of the basic material thickness. The angle M of the groove bottom, from the vertical plane, is preferably in the range 30 to 45 degrees, more preferably about 35 degrees. The radius at the groove bottom is preferably less than about 0.010 inch, more preferably it is a knife edge. The groove shape away from the bottom, that is, the sidewalls, do not have to be precise V shape, but may be stepped, curved, etc.

Figure 9:
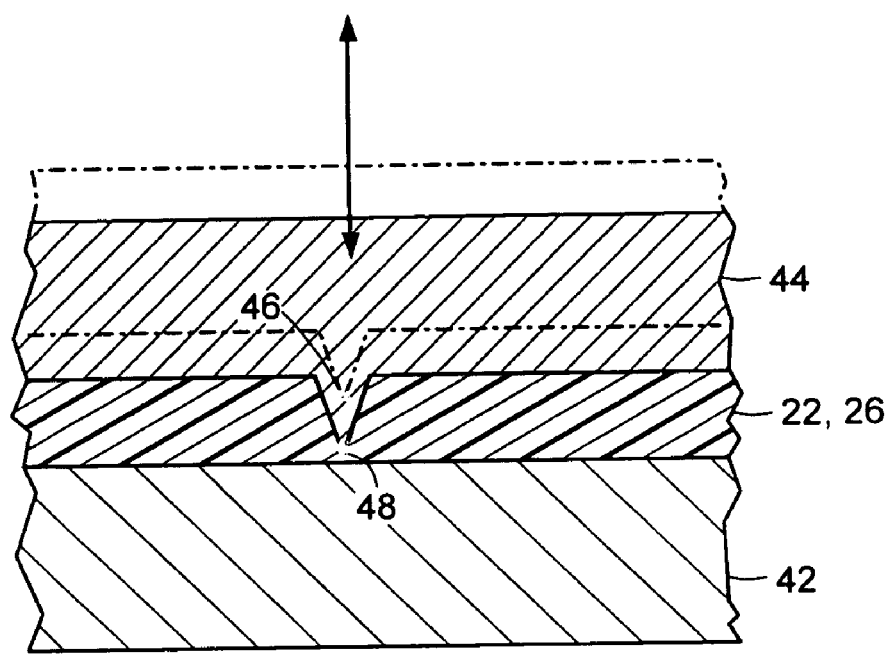
FIG. 9 is related to FIG. 8 and shows a cross section of a portion of a seal assembly, as it is contained within an injection molding mold set, used to make the seal assembly.

However, it is not so easy to form such grooves, particularly when the seal assembly is integral with a larger article; such as the injection molded endplate of a leaching chamber. The problem and solution are illustrated by FIG. 9, which is a cross section through the seal assembly part of FIG. 8, as it is formed within the opposing parts 42, 44 of a mold. During injection molding, to fully form a part, it is necessary to flow plastic material through the small gap 48 between mold half 42 and the tip of the V-shape land 46 of mold half 44. When gap 48 is nominally as low as 0.005 inch, notwithstanding the high pressures associated with conventional or gas assisted injection molding, and logical placement of injection sprues, it has been found that a special manufacturing technique is necessary with the aforementioned PP, to form the requisite special groove and fill an area, such as region 26 or region 22, on either side of circle groove C2. Of course, the ability of a thermoplastic to fill thin parts of mold is related to the molding parameters, including the Melt Flow Index of the particular material being used. Notwithstanding, for all materials there will be a small gap where the present invention should be useful.

The problem is solved in the present invention my having a locally movable part of the mold, so that the gap 48 is temporarily made larger during injection of plastic. With reference to FIG. 9, at least one of the mold halves is locally movable, preferably mold part 44 which has the groove-defining land 46. When plastic is first injected into the mold, the part 44 is separated from mold part 42, as illustrated by the phantom rendering of mold part 44. At the point in time during injection, where test moldings show sufficient material has entered the difficult to fill regions such as regions 26, 22, the locally movable part of the mold is moved, so that the spacing between the mold parts provides the dimensions desired in the finished component. Plastic between the mold halves is displaced, and to an extent flows about in the mold, including back toward the injection source. The desired mold movement is obtained by means of hydraulic cylinders, cams, and other devices well known in injection molding. When the part has been cooled, the whole mold is opened and the part is removed.

The just-described method of moving the mold during injection may be applied to fabricating articles other than seal assemblies, wherein a groove bottom or other like feature, where there is an extremely thin layer required at the bottom of a depression in a finished part. The invention may be applied to injection molded materials other than PP, having tear resistance substantially greater than LDPE (which has a Graves Tear value of about 320, as determined by ASTM D1004). For example, PP has a value of about 470–500. PP as defined in this aspect of the invention refers to a material which is predominantly PP. So, for example, PP may contain minor fraction amounts of nylon, calcium carbonate, impact modifiers such as TPO, TPE, EPDM, etc. Conventional injection molding equipment may be used. Preferably gas assisted injection molding is used as described in U.S. Pat. No. 5,401,459 of Nichols et al., the disclosure of which is hereby incorporated by reference.

Although this invention has been shown and described with respect to one or more preferred embodiments, and by examples, those should not be considered as limiting the claims, since it will be understood by those skilled in this art that various changes in form and detail thereof may be made without departing from the spirit and scope of the claimed invention.

We claim:

1. A seal assembly made of thermoplastic, for receiving different diameters of pipes, comprising:
   a frame, adapted for forming a portion of a wall of an article to which one of said pipes is to be connected;
   at least two circles embossed on thermoplastic sheet material contained within the frame, comprising first embossed circle C1 having first radius R1, and second embossed circle C2 having second radius R2, which is greater than the first radius R1, wherein the space between said circles comprises a deformable region;
   a multiplicity of weakened spots, spaced apart circumferentially around said deformable region;
   wherein, when the plastic sheet material within said first circle is removed, to thereby create a hole having a circumferential rim and a corresponding rim diameter at the location of the circle C1, said rim diameter may be increased by axial and radial deformation of said deformable region, to receive a pipe diameter which is larger than said corresponding rim diameter.

2. The seal assembly of claim 1 wherein the circles C1 and C2 are eccentric and said deformable region is a crescent.

3. The seal assembly of claim 2, wherein said weakened spots comprise perforations concentrated in a wider part of said crescent.

4. The seal assembly of claim 1 wherein said weakened spots comprise perforations having a rectangular shape, wherein the major axes of the perforations run substantially radially from approximately the location of the center of second circle C2.

5. The seal assembly of claim 1 wherein the weakened spots comprise perforations which taper inwardly, so that each perforation opening on one surface of the seal is larger than on the opposing surface.

6. The seal assembly of claim 1 wherein the circles C1 and C2 are concentric and said deformable region is ring shaped.

7. The seal assembly of claim 1 wherein said weakened spots are perforations having tapered sides, so that each perforation opening is wider of one surface on said deformable region than on the opposing surface.

8. The seal assembly of claim 1 further comprising, at least one additional embossed circle C3 having a radius R3 which is smaller than the first radius R1, contained within the circumference of the second circle C2.

9. The seal assembly of claim 8, further comprising embossed pull tabs, one each for removal by tearing of the material within the additional circle C3 and between the additional circle C3 and the first circle C1.

10. The seal assembly of claim 1, further comprising an embossed pull tab, for removing of the material within the first circle C1 by tearing of the material along the first circle C1.

11. The seal assembly of claim 1 wherein said embossed first circle C1 is a V-shape groove.

12. The seal assembly of claim 11, comprised substantially of polypropylene material, wherein the V-shape groove has a small radius bottom approximating a knife edge; wherein, the material thickness at the bottom of the groove is equal to or less than than about 0.0.1 inch.

13. The seal assembly of claim 1, comprised substantially of polypropylene material, the assembly having a region with a tear out portion defined by a groove; the groove having a V-shape bottom with a small radius approximating a knife edge; wherein, the material thickness at the bottom of the groove is equal to or less than about 0.01 inch.

14. The seal assembly of claim 1, integrally molded into a leaching chamber, a distribution box for a leaching system, or an accessory thereof.

15. The seal assembly of claim 1, made by injection molding of said thermoplastic into a mold comprised of opposing cooled mold parts, wherein at least a portion of said embossed circles comprises a substantially V-shape groove.

16. In a method of sealing a pipe which runs through a hole in a seal assembly, to inhibit movement of soil from the exterior to the interior of the seal assembly, wherein the seal assembly includes a sheet portion surrounding said hole, and wherein said portion is comprised of material which deforms when the pipe is inserted in said hole, the improvement which comprises: providing a multiplicity of circumferentially spaced apart weakened spots around at least part of said portion, near said hole, so that the when said sheet portion is deformed, deformation is concentrated in localized regions adjacent said weakened spots.

* * * * *